(12) United States Patent
Viswanadham (10) Patent No.: US 9,606,609 B2
(45) Date of Patent: Mar. 28, 2017

(54) MODIFYING POWER CONSUMPTION BASED ON ENERGY-USAGE MESSAGES

(71) Applicant: Google Inc., Mountain View, CA (US)

(72) Inventor: Prerepa V. Viswanadham, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/808,527

(22) Filed: Jul. 24, 2015

(65) Prior Publication Data

US 2016/0070332 A1 Mar. 10, 2016

Related U.S. Application Data

(60) Provisional application No. 62/047,504, filed on Sep. 8, 2014.

(51) Int. Cl.
*G06F 1/32* (2006.01)
*G06F 1/00* (2006.01)

(52) U.S. Cl.
CPC .......... *G06F 1/3234* (2013.01); *G06F 1/3206* (2013.01); *G06F 1/3287* (2013.01)

(58) Field of Classification Search
CPC .................................................... G06F 1/3203
USPC ......................................................... 713/320
See application file for complete search history.

(56) References Cited

U.S. PATENT DOCUMENTS

| 7,536,573 | B2* | 5/2009 | Schumacher | G06F 1/3215 713/300 |
|---|---|---|---|---|
| 7,669,071 | B2* | 2/2010 | Cochran | G06F 1/263 713/300 |
| 7,796,050 | B2 | 9/2010 | Yasui et al. | |
| 7,827,425 | B2* | 11/2010 | Hutsell | G06F 1/3203 710/18 |
| 8,089,368 | B2 | 1/2012 | Hong et al. | |
| 8,332,945 | B2 | 12/2012 | Kim et al. | |
| 2006/0149978 | A1* | 7/2006 | Randall | G06F 1/3203 713/300 |
| 2012/0022711 | A1* | 1/2012 | Sakaguchi | H02J 13/0017 700/295 |
| 2013/0197708 | A1* | 8/2013 | Song | H04Q 9/00 700/295 |
| 2013/0204449 | A1* | 8/2013 | Ahn | H04L 12/2803 700/291 |

(Continued)

*Primary Examiner* — Suresh Suryawanshi
(74) *Attorney, Agent, or Firm* — McDonnell Boehnen Hulbert & Berghoff LLP (57) ABSTRACT

Examples described herein involve modifying power consumption based on energy usage messages. A method includes a CPU periodically receiving energy-usage messages from components. From the energy-usage messages, the CPU determines a plurality of historical energy-usage patterns that indicate respective historical energy consumption of a given component while operating in a given operating state. Then, the CPU determines that overall power consumption of the one or more components differs from an expected power consumption. Thereafter, the CPU identifies at least one differing component that is causing the power consumption differential based on the historical energy-usage patterns and a plurality of new energy-usage messages received after the plurality of historical energy-usage patterns were determined. The CPU then causes the at least one differing component to modify an amount of energy that the at least one differing component is consuming.

20 Claims, 5 Drawing Sheets

(56) References Cited

U.S. PATENT DOCUMENTS

2014/0207304 A1\* 7/2014 Yamaguchi ............ F24F 11/006
                                                    700/297
2014/0281648 A1   9/2014 Russell et al.
2015/0076926 A1\* 3/2015 Kosaka .................... H02J 3/14
                                                    307/126

\* cited by examiner

MODIFYING POWER CONSUMPTION BASED ON ENERGY-USAGE MESSAGES

CROSS REFERENCE TO RELATED APPLICATIONS

This application claims priority to U.S. Provisional Patent Application No. 62/047,504 filed Sep. 8, 2014, entitled "Modifying Power Consumption Based On Energy-Usage Messages," which is herein incorporated by reference in its entirety.

BACKGROUND

Unless otherwise indicated herein, the materials described in this section are not prior art to the claims in this application and are not admitted to be prior art by inclusion in this section.

Mobile computing devices, such as cellular phones, smart phones, tablets, and other mobile computing devices, may have a limited battery life per battery charge. At times, some internal components and/or applications of a mobile computing device may behave abnormally and thereby cause unexpected battery drain. Moreover, the central processing unit of the mobile computing device may be unable to determine what internal component or application is causing the unexpected battery drain. Consequently, a user of the mobile computing device may find the battery life unpredictable.

SUMMARY

In one example, a method is provided that involves periodically receiving, by one or more processors of a computing device from a plurality of components of the computing device, a plurality of energy-usage messages. A given energy-usage message indicates an operating state of a given component and an amount of energy consumed by the given component while operating in the operating state. The method further involves based on the plurality of energy-usage messages, determining a plurality of historical energy-usage patterns. A given energy-usage pattern indicates historical energy consumption of a given component while operating in a given operating state. The method also involves, while one or more of the plurality of components are consuming energy, determining that overall power consumption of the one or more components differs from an expected power consumption of the one or more components. The method additionally involves identifying at least one differing component that is causing the overall power consumption to differ from the expected power consumption based on the plurality of historical energy-usage patterns and a plurality of new energy-usage messages received after the plurality of historical energy-usage patterns were determined. The method further involves modifying an amount of energy that the at least one differing component is consuming.

In another example, a computer-readable medium having stored therein instructions that when executed by a computing device cause the computing device to periodically receive, by one or more processors of the computing device from a plurality of components of the computing device, a plurality of energy-usage messages. A given energy-usage message indicates an operating state of a given component and an amount of energy consumed by the given component while operating in the operating state. The instructions, when executed by the computing device, additionally cause the computing device to, based on the plurality of energy-usage messages, determine that overall power consumption of one or more components of the computing device differs from an expected power consumption of the one or more components. Moreover, the instructions, when executed by the computing device, cause the computing device to identify at least one differing component that is causing the overall power consumption to differ from the expected power consumption. The instructions, when executed by the computing device, also cause the computing device to modify an amount of energy that the at least one differing component is consuming.

In yet another example, a computing device is provided that includes one or more processors, a plurality of components, and a computer-readable medium having stored therein executable instructions. The instructions are executable by the one or more processors to cause the computing device to periodically receive, by the one or more processors from the plurality of components, a plurality of energy-usage messages. A given energy-usage message indicates an operating state of a given component and an amount of energy consumed by the given component while operating in the operating state. The instructions are further executable by the one or more processors to cause the computing device to, based on the plurality of energy-usage messages, determine a plurality of historical energy-usage patterns. A given energy-usage pattern indicates historical energy consumption of a given component while operating in a given operating state. The instructions are further executable by the one or more processors to cause the computing device to, while one or more of the plurality of components are consuming energy, determine that overall power consumption of the one or more components differs from an expected power consumption of the one or more components. The instructions are further executable by the one or more processors to cause the computing device to identify at least one differing component that is causing the overall power consumption to differ from the expected power consumption based on the plurality of historical energy-usage patterns and a plurality of new energy-usage messages received after the plurality of historical energy-usage patterns were determined. The instructions are further executable by the one or more processors to cause the computing device to modify an amount of energy that the at least one differing component is consuming.

In yet another example, a system is provided that includes a means for periodically receiving, from a plurality of components, a plurality of energy-usage messages. A given energy-usage message indicates an operating state of a given component and an amount of energy consumed by the given component while operating in the operating state. The system also includes a means for, based on the plurality of energy-usage messages, determining a plurality of historical energy-usage patterns. A given energy-usage pattern indicates historical energy consumption of a given component while operating in a given operating state. The system also includes a means for, while one or more of the plurality of components are consuming energy, determining that overall power consumption of the one or more components differs from an expected power consumption of the one or more components. The system also includes a means for identifying at least one differing component that is causing the overall power consumption to differ from the expected power consumption based on the plurality of historical energy-usage patterns and a plurality of new energy-usage messages received after the plurality of historical energy-usage patterns were determined. The system also includes a means for modifying an amount of energy that the at least one differing component is consuming.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems, devices, and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Figure 1:
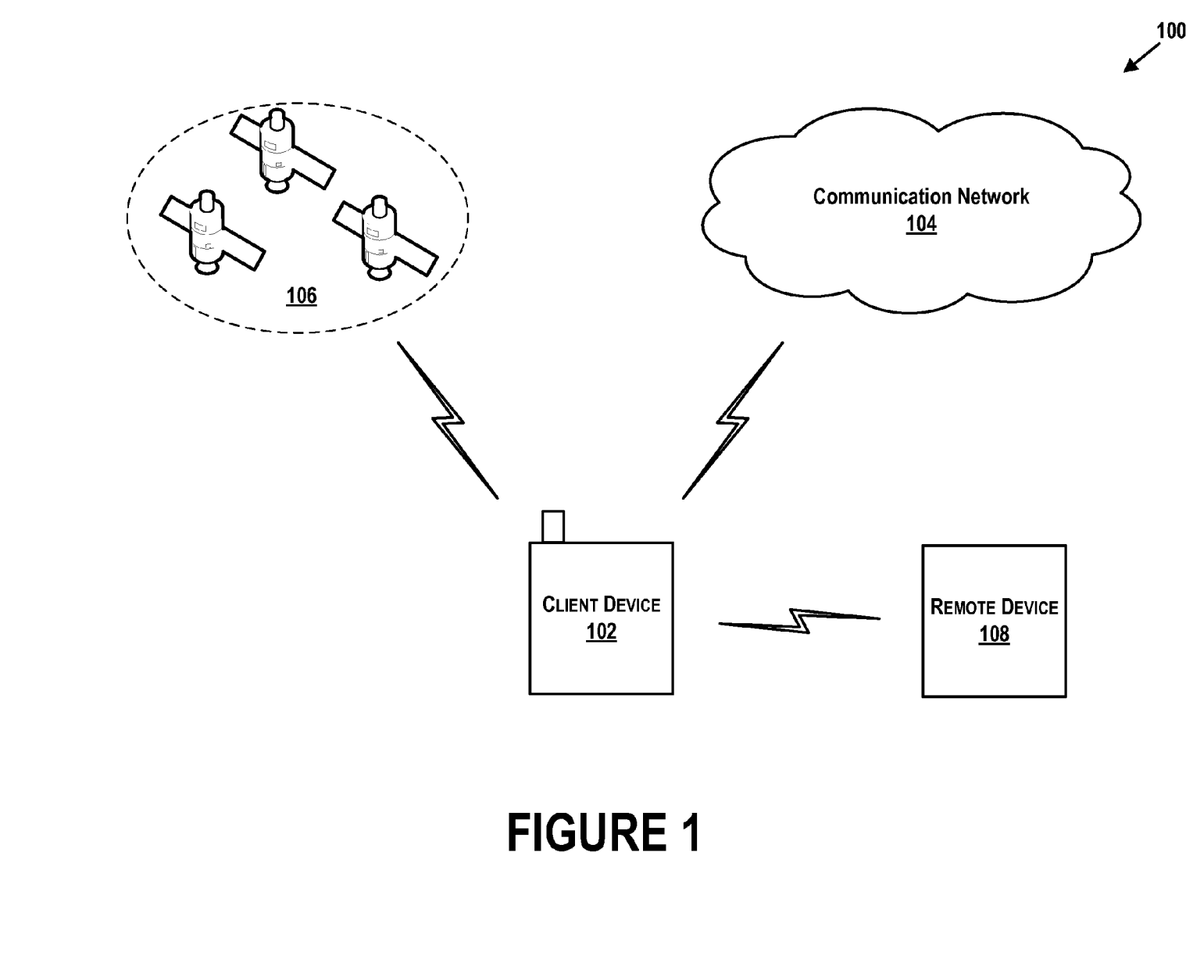
FIG. 1 shows an example communication system in which example embodiments may be implemented.

Referring now to the figures, FIG. 1 shows an example communication system 100 in which example embodiments may be implemented. As shown, the communication system includes a client device 102, a communication network 104, a global navigation satellite system ("GNSS") 106, and a remote device 108. The client device 102 may be communicatively coupled to the communication network 104, the GNSS 106, and the remote device 108 via multiple communication links.

The client device 102 may be any type of computing device that is configured to transmit data to and receive data from the communication network 104. Moreover, the client device 102 may be configured to receive data from the GNSS 106. Further, the client device 102 may be configured to transmit data to and receive data from the remote device 108. In example implementations, the client device 102 may be or include a mobile telephone, a tablet computing device, a laptop computer, an email/messaging device, or some other wireless communication device.

The client device 102 may include a user interface, a battery, one or more communication interfaces, one or more central processing units ("CPUs"), and data storage comprising instructions executable by one or more CPUs for carrying out one or more operations relating to the data sent to, or received by, the client device 102. The user interface may include buttons, a touchscreen, a microphone, and/or any other elements for receiving inputs, as well as a speaker, one or more displays, and/or any other elements for communicating outputs. The client device 102 is discussed in further detail below.

The communication network 104 may include one or more computing systems and/or devices and network infrastructure configured to provide voice and/or data services to various client devices, such as the client device 102. Moreover, the communication network 104 may provide such services by utilizing one or more wireless communication technologies. Examples of such technologies include Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), Global System for Mobile Communications (GSM), and WiFi, among others.

The GNSS 106 may include one or more satellites configured to provide satellite navigational information to various GNSS receivers, such as the client device 102. In examples, the GNSS 106 may be the Global Positioning System (GPS), Galileo, or GLONASS GNSS.

The remote device 108 may be any type of computing device that is configured to establish a point-to-point wireless connection with the client device 102. As such, the remote device 108 may be configured to operate according to Bluetooth and/or Bluetooth Low Energy (LPE) technologies, among other technologies. In some examples, the remote device 108 may be the same form as the client device 102. In other examples, the remote device 108 may be a wearable device paired to the client device 102. Examples of such devices may include a headset, a head-mountable display, and a biometric monitoring device, among other examples.

Figure 2:
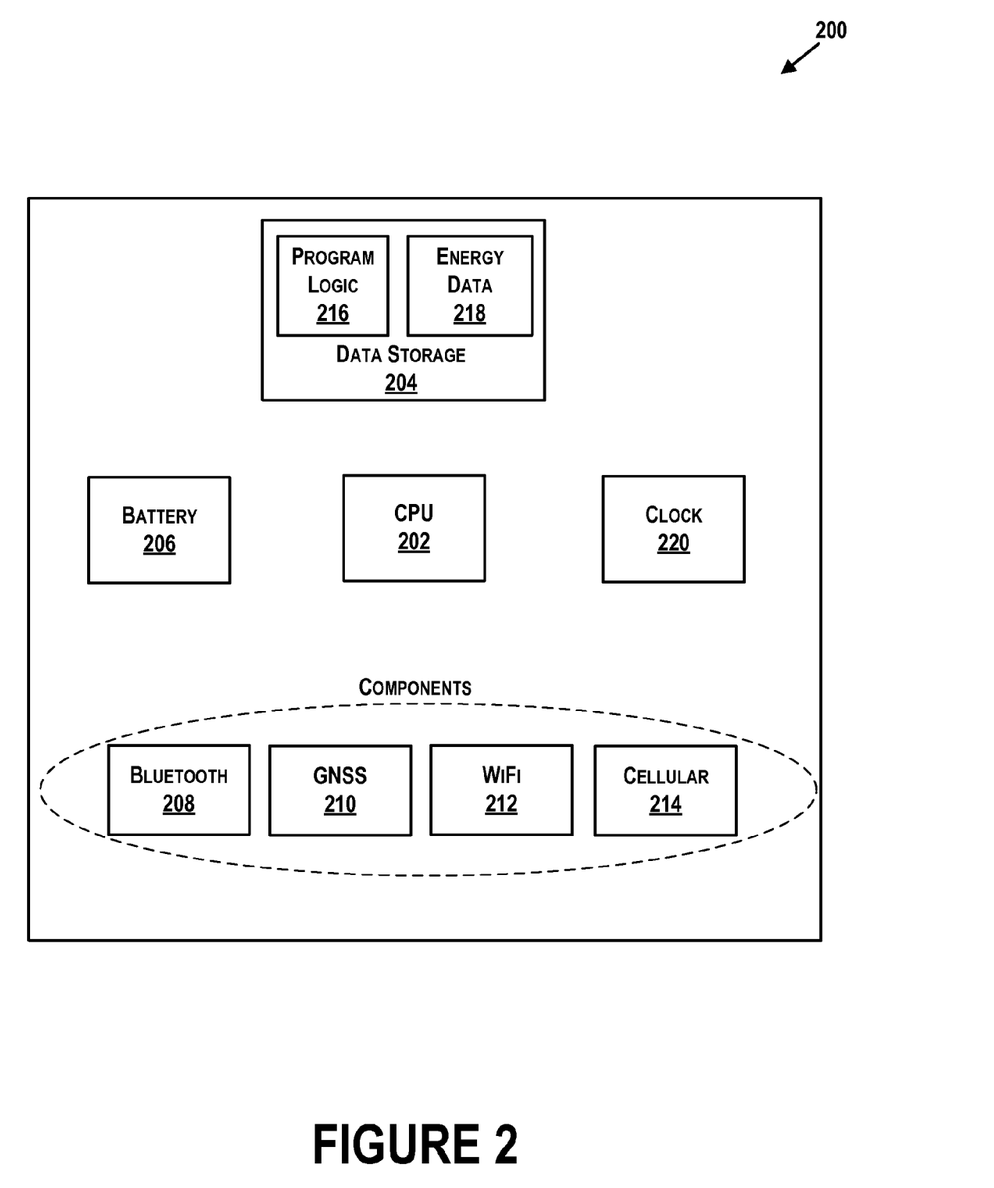
FIG. 2 shows a simplified block diagram illustrating an example computing device.

FIG. 2 shows a simplified block diagram illustrating an example computing device 200. The computing device 200 may be the client device 102 from FIG. 1. In some examples, some components illustrated in FIG. 2 may be distributed across multiple computing devices. However, for the sake of example, the components are shown and described as part of one example client device 200. The client device 200 may be or include a mobile telephone, a tablet computing device, a laptop computer, an email/messaging device, or a similar device that may be configured to perform the operations described herein.

In some implementations, the client device 200 may include a device platform (not shown), which may be configured as a multi-layered Linux platform. The device platform may include different applications and an application framework, as well as various kernels, libraries, and runtime entities. In other examples, other platforms or formats may operate the client device 200 as well.

The client device 200 may include a CPU 202, data storage 204, a battery 206, one or more components, such as a Bluetooth component 208, a GNSS component 210, a WiFi component 212, and a cellular component 214, and a clock 220. It should be understood that the client device 200 may include multiple of the aforementioned elements as well as additional elements not shown. For example, the client device 200 may include a user interface, one or more sensors, a graphics processing unit, and/or one or more additional components, among other elements.

The elements of the client device 200 may be coupled together by one or more communication links. A communication link may provide wired or wireless connections. In examples, a communication link may be a wired serial bus, such as a universal serial bus or a parallel bus, or a wireless connection.

The CPU 202 may be configured to manage and/or control the operations of the client device 200. In particular, the CPU 202 may manage and/or control the operations of each of the components. The CPU 202 may include one or more processors. A processor may take the form of a general-purpose processor or a special-purpose processor (e.g., digital signal processors, application specific integrated circuits, etc.). The CPU 202 may be configured to store, access, and execute computer-readable program logic 216 that is stored in the data storage 204 to perform the operations of a client device described herein. The CPU 202 may also be configured to store and access energy data 218 stored in the data storage 204.

Further, the CPU 202 may utilize a device platform that enables the execution of various applications. During execution of a given application, the CPU 202 may be configured to cause one or more of the components to perform an operation according to the executing application. Accordingly, the CPU 202 may be configured to send to the components signals indicating a particular command via the one or more communication links.

Moreover, the CPU 202 (and perhaps one or more modules not shown) may be configured to monitor the overall power consumption of the client device 200. In one example, the overall power consumption may comprise the total power consumption of the device 200. In another example, the overall power consumption may comprise the combined consumption of the one or more components that are consuming energy (i.e., power consumption of only some of the components of the device 200). In some examples, the CPU 202 may be configured to periodically request that the components provide respective energy information. Additionally or alternatively, in some examples, the components may be configured to self-report the respective energy information. In one example, a peripheral (e.g., component) may be configured to periodically (e.g., at some frequency) provide the energy information. In another example, a component may provide the energy information in response to the component detecting an amount of energy usage that is greater (or less) than a threshold. In yet another example, the component may provide the energy information in response to an event or trigger such as at start-up of the device 200, when an application requests operation of the component, or any other event. The CPU 202 may also be configured to determine multiple energy-usage patterns for each component based on energy-usage information the CPU 202 receives from each of the components. The CPU 202 may be configured to then use the energy-usage patterns to monitor the power consumption of the client device 200 for any abnormalities and take corrective action if needed.

The data storage 204 may include or take the form of one or more computer-readable storage media that may be read or accessed by the CPU 202. The one or more computer-readable storage media may include volatile and/or non-volatile storage components, such as optical, magnetic, organic or other memory or disc storage, which can be integrated in whole or in part with the CPU 202. In some embodiments, the data storage 204 may be implemented using a single physical device (e.g., one optical, magnetic, organic or other memory or disc storage unit), while in other embodiments, the data storage 204 may be implemented using two or more physical devices.

As noted, the data storage 204 may include computer-readable program instructions (e.g., the program logic 216) and perhaps additional data, such as the energy data 218. As such, the data storage 204 may include program instructions that may be executed to perform or facilitate some or all of the client device 200 operations described herein.

The battery 206 may be configured to provide electrical power to the client device 200. The battery 206 may be configured to be rechargeable and interface with an external power source. The battery 206 may be electrically coupled to each component of the client device 200 that requires electrical power to operate. In example implementations, the battery 206 may apply the same, known voltage to each of the components. For example, a voltage from 3.6 volts to 4.2 volts, among other possibilities.

In general, a given component may be any energy-consuming component of the client device 200 that is external to the CPU 202. Accordingly, the components depicted in FIG. 2 should not be construed as limiting. In some examples, one or more the components may be external to the client device 200 itself (e.g., one or more peripheral components).

Each component may include suitable logic, circuitry, and/or code that may be configured to provide the functionality of the component. Generally, the Bluetooth component 208 may be configured to allow the client device 200 to perform Bluetooth technology related functions. The GNSS component 210 may be configured to allow the client device 200 to perform functions related to geo-spatial locating/positioning. The WiFi component 212 may be configured to allow the client device 200 to connect to an access point to access a communication network and/or perform other WiFi technology functions. The cellular component 214 may be configured to allow the client device 200 to connect to a base station of cellular service provider and/or perform other cellular communication functions.

Further, each component may be or include a communication interface that is configured to facilitate wireless data communication for the client device 200 according to one or more wireless communication standards. For example, the Bluetooth component 208 may include a Bluetooth communication component that is configured to facilitate wireless data communication according to one or more Bluetooth standards; the WiFi component 212 may include a Wi-Fi communication component that is configured to facilitate wireless data communication according to one or more IEEE 802.11 standards; and the cellular component 214 may include a cellular communication component that is configured to facilitate wireless data communication according to one or more cellular data communication protocols. Similarly, the GNSS component 210 may include a GNSS receiver component that is configured to receive geo-spatial positioning signals to facilitate determining the location of the client device 200.

Moreover, each component may be configured to receive signals from the CPU 202 and based on the received signals, perform one or more operations. Such operations may involve reporting energy information to the CPU 202. In other examples, each component may be configured to self-report energy information to the CPU 202. That is, each component may be configured to report energy information without receiving signaling from the CPU 202. Other examples also exist.

The clock 220 may be configured to regulate the time and speed of the various operations of the client device 200. In particular, the clock 220 may facilitate the CPU 202 periodically requesting respective energy information from the components, the CPU 202 periodically sampling the overall energy consumption of the client device 200, and/or the components periodically reporting energy information to the CPU 202.

Example methods described herein may be performed individually by components of the client device 200, or in combination by one or all of the components of the client device 200. In one instance, portions of the client device 200 may process data and provide an output internally in the client device 200 to the CPU 202, for example. In other instances, portions of the client device 200 may process data and provide outputs externally to other computing devices, such as the remote device 108.

Figure 3:
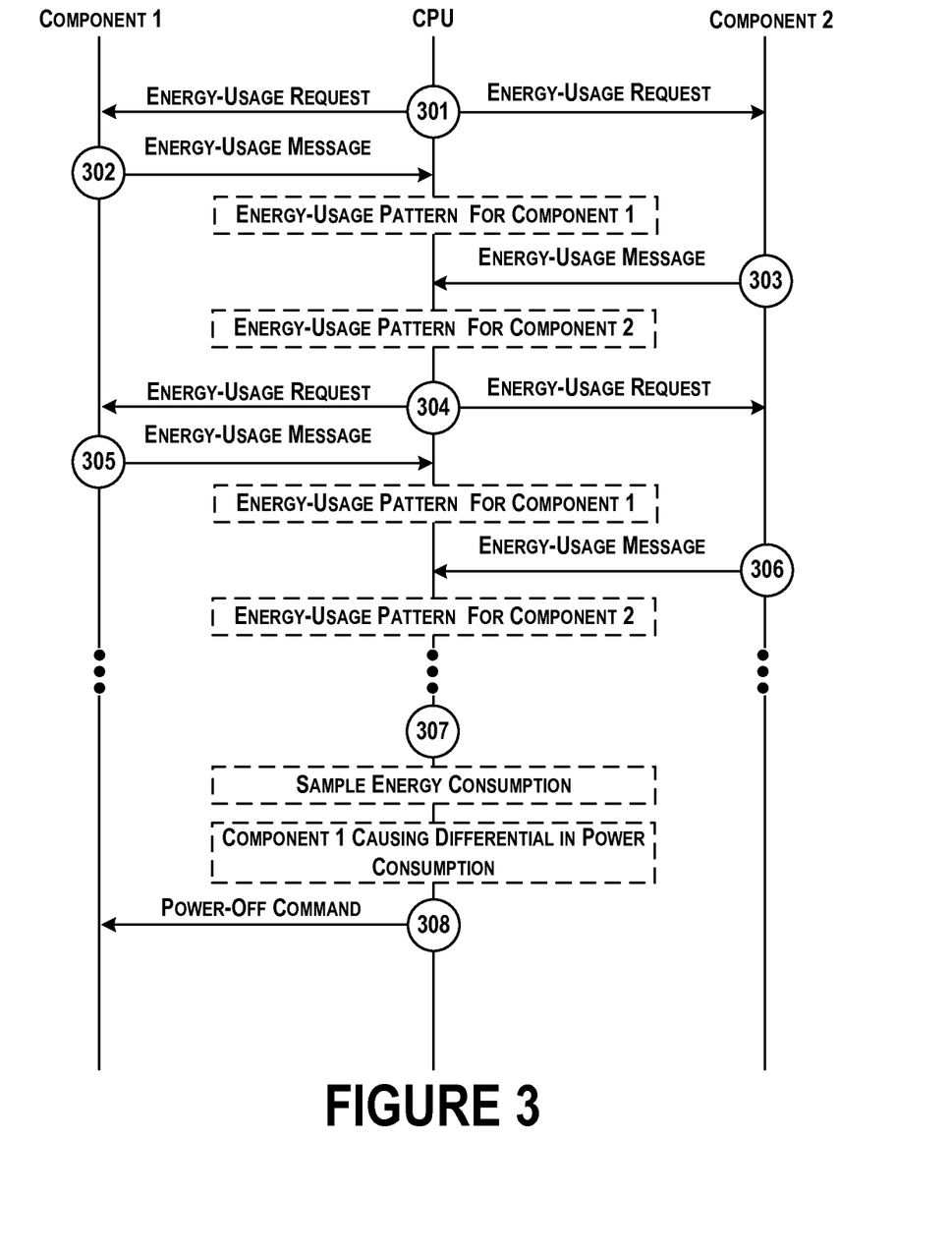
FIG. 3 shows a timing diagram illustrating example timing of various communications between a CPU and multiple components.

FIG. 3 is a timing diagram illustrating example timing of various communications between the CPU 202 and multiple components. Although FIG. 3 includes an indication of two components, it should be understood that this is for sake of simplicity and explanation. Communications between the CPU 202 and more or less components is also possible.

As shown, the CPU 202 may transmit 301 respective energy-usage requests to components 1 and 2 (e.g., the Bluetooth component 208 and the GNSS component 210). An energy-usage request may generally include a command for the components to report respective energy-usage information. Requesting that the components report energy-usage information, as opposed to the CPU 202 determining such information, may help reduce the processing load on the CPU 202 and thereby help allow the CPU 202 to handle other operations.

In some examples, the CPU 202 may transmit energy-usage requests to each component periodically. Additionally or alternatively, the CPU 202 may transmit an energy-usage request to a particular component after the CPU 202 transmits a command (e.g., to scan for GNSS signals) to the particular component. In other cases, the CPU 202 may transmit an energy-usage request to a particular component after the CPU 202 receives from the particular component an indication that the component executed a command. Other examples are also possible.

In any event, the Bluetooth component 208 may transmit 302 an energy-usage message to the CPU 202. Generally, an energy-usage message provides the CPU 202 an indication of an amount of energy that the given component consumed since the component sent its last energy-usage message. In examples, an energy-usage message indicates an operating state of the given component and an amount of energy consumed by the given component while operating in the operating state. The energy-usage message may indicate the given component's current operating state and energy consumption, or an operating state (or states) that the component was recently in as well as the amount of energy consumed while in that operating state. In some examples, after a component transmits an energy-usage message, the component clears that energy information so that it may start recording information for its next energy-usage report.

Generally, at any given time, a given component may be in a particular operating state. The operating state may represent a high-level view of the present operating state of the given component. Accordingly, the given component may be in the same operating state while performing different operations.

For example, each operating state may correspond to a different amount of current that is drawn during that operating state. A range of current values may define the scope of the operating states. Thus, while a component is performing any activities that draw, for example, 1-10 mA, the component may be in a first operating state, and while the component is performing any activities that draw, for example, 11-20 mA, the component may be in a second operating state. Each component may be configured to determine an amount of current it is drawing and thus, determine its operating state.

In some examples, an operating state may be an idle state, a transport state, or a miscellaneous state. Generally, the idle state may indicate a low energy consumption state, the transport state may indicate a high energy consumption state, and the miscellaneous state may indicate a mid-level energy consumption state.

In examples, the idle state may represent a period during which a given component is "sleeping" or a period during which the given component is in between performing relatively higher energy consuming activities. Such an idle state may correspond to activities that draw approximately 0-1000 µA, among other examples. The transport state may represent a period during which the given component is transmitting or receiving data. Such a transport state may correspond to activities that draw approximately 75-250 mA, among other examples. The miscellaneous state may represent a period during which the given component is performing internal activities or other relatively mid-level energy activities. Such a miscellaneous state may correspond to activities that draw approximately 1-75 mA, among other examples. One of ordinary skill in the art will appreciate that the above example current ranges are provided for purposes of example and explanation and should not be construed as limiting. Other example current ranges and operating states are also possible.

In some cases, an energy-usage message may include an indication of a voltage applied to the given component, an indication of a current received by the given component, and/or a duration of time the current was received by the given component. In such cases, the given component, perhaps utilizing other elements of the client device 200, may determine each of these values. In particular, the voltage applied to the given component may be known to the component (e.g., the battery 206 may apply the same voltage to each component); the given component may be configured to determine the current that it is drawing from the battery 206; and the given component, perhaps utilizing the clock 220, may be configured to track the amount of time it is receiving current from the battery 206. In other cases, the given component may be configured to use these values to determine its total energy consumption, for example, since it last sent an energy-usage message, which may then be included in an energy-usage message.

In example implementations, an energy-usage message may include information regarding multiple actions that the given component performed since its last energy-usage message. Such energy-usage messages may be demarcated by completed activity (e.g., command executed by a given component). In particular, for each activity completed by the given component, an energy-usage message may indicate the total time transmitting, total time receiving, total time idling, and total amount of energy consumed while performing the activity by the component. The energy-usage message may also provide an indication of the operating state that that performed activity is classified under.

Returning to FIG. 3, after the Bluetooth component 208 transmits 302 the energy-usage message, the CPU 202 may use the information from that energy-usage message and previously received energy-usage messages from the Bluetooth component 208 to determine an energy-usage pattern. Energy-usage patterns are described in detail below, but in general, an energy-usage pattern indicates historical energy consumption by a given component while operating in a given operating state. The CPU 202 may store the energy-usage pattern in energy data 218.

After or while the CPU 202 determines the energy-usage pattern for the Bluetooth component 208, the GNSS component 210 may transmit 303 an energy-usage message to the CPU 202 in much the same way as the Bluetooth component 208. The CPU 202 may similarly determine an energy-usage pattern corresponding to the operating state identified in the energy-usage message sent by the GNSS component 210.

Thereafter, the CPU 202 may again transmit 304 respective energy-usage requests to the Bluetooth component 208 and the GNSS component 210. In line with the above discussion, the Bluetooth component 208 and the GNSS component 210 may in turn transmit 305 and 306, respectively, energy-usage messages to the CPU 202. In the event that the energy-usage messages indicate the same operating states from the previous energy-usage messages (e.g., 302 and 303 respectively), the CPU 202 may update the same energy-usage patterns as before. Otherwise, the CPU 202 may determine different energy-usage patterns corresponding to the operating states identified by these energy-usage messages.

The above discussed communications and operations may continue to occur, and over time, the CPU 202 may determine energy-usage patterns for each operating state of each component. The CPU 202 may then utilize these energy-usage patterns to monitor and otherwise manage the power consumption of the client device 200.

In particular, at some point in time, the CPU 202 may sample the overall power consumption of the client device 200 or perhaps the overall power consumption of the components. In any event, the CPU 202 may determine that the sampled value reflects a power consumption that differs from an expected power consumption of the client device 200. The CPU 202 may then utilize the stored energy-usage patterns and energy-usage messages received after the energy-usage patterns were determined (e.g., the most recently received energy-usage messages) to determine the cause of the difference in the power consumption.

The CPU 202 may determine that the Bluetooth component 208 is abnormally consuming energy (e.g., the Bluetooth component 208 is searching for the remote device 108 when the Bluetooth component 208 should be sleeping) or abnormally consuming power (e.g., the Bluetooth component 208 is consuming energy faster than normal). The CPU 202 may then determine a corrective action and transmit 308 a command to the Bluetooth component 208, which here, is a power-off command. These operations are discussed in further detail below with respect to method 500.

Figure 4:
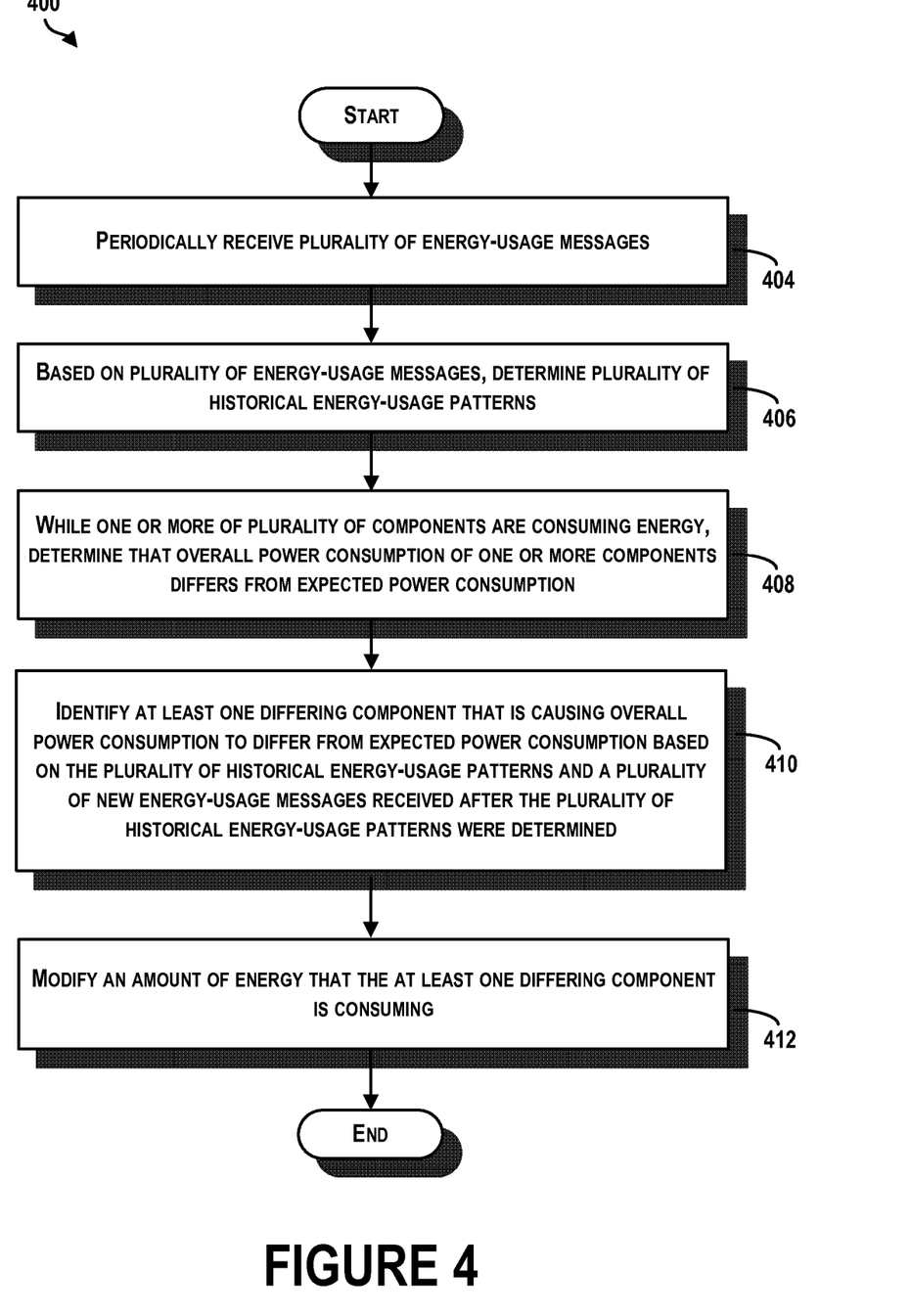
FIG. 4 shows a flowchart of an example method of correcting power consumption based on energy-usage messages.

FIG. 4 is a flowchart of an example method of correcting power consumption based on energy-usage messages, in accordance with at least some embodiments described herein. Method 400 shown in FIG. 4 presents an embodiment of a method that, for example, could be used with the system 100 in FIG. 1, or the client device 200 in FIG. 2. Method 400 may include one or more operations, functions, or actions as illustrated by one or more of blocks 404-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

Furthermore, for the method 400 and other processes and methods disclosed herein, each block in FIG. 4 may represent circuitry that is wired to perform the specific logical functions in the process. The method 400 may be fully performed by a computing device (or components of a computing device), such as the client device 200, or may be distributed across multiple computing devices and/or systems.

At block 404, the method 400 involves one or more processors periodically receiving from a plurality of components, a plurality of energy-usage messages. As discussed above, a given energy-usage message may indicate an operating state of a given component and an amount of energy consumed by the given component while operating in that operating state. In practice, the Bluetooth component 208, the GNSS component 210, the WiFi component 212, and the cellular component 214 may each transmit respective energy-usage messages to the CPU 202. The components may do this periodically based on the periodic energy-usage requests sent by the CPU 202.

In some implementations, the one or more processors may periodically receive the plurality of energy-usage messages without first transmitting a plurality of energy-usage requests. In such implementations, each of the components may be programmed to periodically self-report energy-usage information to the CPU 202. In some cases, the components may report at the same frequency, and in other cases, some or all of the components may report at different frequencies. In other cases, a given component may be programmed to self-report energy-usage information to the CPU 202 after the given component performs certain operations and/or after the given component determines that certain events occurred. For example, the given component may self-report after executing a command received from the CPU 202 (e.g., after the given component enters Airplane mode), after the given component transitions from one operating state to another, or after determining that the component established a data connection or lost a data connection. Other examples are also possible.

However, in some embodiments, the one or more processors may receive the plurality of energy-usage messages in response to the one or more processors providing the plurality of energy-usage requests. Accordingly, in some examples, the method 400 also involves the one or more processors periodically transmitting to the plurality of components a plurality of energy-usage requests. For example, the CPU 202 may transmit an energy-usage request to the Bluetooth component 208, the GNSS component 210, the WiFi component 212, and the cellular component 214 in line with the above discussion. The period at which the CPU 202 transmits such requests may depend on how the client device 200 is programmed.

In some examples, the one or more processors may transmit one respective energy-usage request to each of the components. In such examples, after the components receive the respective energy-usage request, the energy-usage request may cause the components to periodically self-report energy information to the CPU 202. In this way, after an initial energy-usage request, the CPU 202 may receive energy information from a given component without further signaling from the CPU 202.

At block 406, the method 400 involves, based on the plurality of energy-usage messages, the one or more processors determining a plurality of historical energy-usage patterns. As discussed above, over time, the CPU 202 may determine a plurality of historical energy-usage patterns for each component that correspond to the various operating states of the given component. For example, the CPU 202 may determine three energy-usage patterns for each component corresponding to energy-usage patterns while in the operating states of idle, transport, and miscellaneous. In other examples, the CPU 202 may determine more or less historical energy-usage patterns for each component, which may depend on the number of operating states of a given component.

In example implementations, a given energy-usage pattern may include a historical value of energy consumption by a given component while operating in a particular operating state. A given energy-usage pattern may also include a duration of time the given component has historically consumed energy while in the given operating state. For example, a transport energy-usage pattern (e.g., an energy-usage pattern while in the transport operating state) for the cellular component 214 may indicate that the cellular component 214 historically consumes 0.45 Watts over a 300 millisecond duration of time.

In other implementations, a given energy-usage pattern may include an energy-consumption range corresponding to the given operating state. An energy-consumption range may include a range of historical values of energy consumption by a given component while in a given operating state. An energy-consumption range may also include a range of time that the given component has historically consumed energy while in the given operating state. For example, a transport energy-usage pattern for the cellular component 214 may indicate that the cellular component 214 historically consumes 0.40-0.50 Watts over 250-350 milliseconds.

In practice, the energy-usage patterns may be determined in a variety of manners. In one example, a given energy-usage pattern may be determined by the CPU 202 determining a running average of the energy usage by a given component while in a given operating state over the life-time of the component. In other examples, the CPU 202 may instead determine an average energy-consumption value and corresponding time from a predetermined number of energy-usage messages corresponding to the given operating state. For instance, the CPU 202 may determine averages from the 10 most recent energy-usage messages that identified the given operating state. In another example, the CPU 202 may determine a given energy-usage pattern by determining median values from all or a portion of energy-usage messages corresponding to a given operating state. Other examples are also possible.

Similarly, in implementations where energy-usage patterns include energy-consumption ranges, such ranges may be determined in a number of manners. In some examples, the CPU 202 may first determine a starting value for the energy consumption as well as for the duration of time using any of the above-discussed techniques. Then, the CPU 202 may determine an error rate based on one or more statistical models. Additionally or alternatively, the CPU 202 may consider an error rate provided by a manufacturer of a given component. Such information may be stored in the data storage 204. In any event, the CPU 202 may then determine the energy-consumption ranges.

At block 408, the method 400 involves, while one or more of the plurality of components are consuming energy, the one or more processors determining that overall power consumption of the one or more components differs from an expected power consumption of the one or more components. In general, a difference in power consumption may indicate that an energy-consumption value is too high or too low or that energy is being consumed too fast or too slow, among other examples.

In practice, the CPU 202 may first take a sample of the amount of energy being consumed by the client device 200. For example, the CPU 202 may determine an amount of current being drawn from the battery 206 over a predetermined duration of time or at a particular point in time. The CPU 202 may determine a portion of the sampled amount of energy that does not correspond to the components (e.g., this portion may correspond to the CPU's 202 own energy consumption) and then attribute the remaining amount to the components. Thereafter, determining that the overall power consumption of the one or more components differs from an expected power consumption of the one or more components may be performed in a number of manners.

In some examples, the CPU 202 may determine that the overall power consumption differs based on one or more commands that were provided by the CPU 202. For instance, the last command provided by the CPU 202 to the components may have been a command for each of the components to power-off or enter Airplane mode, among other examples. Sometime after the CPU 202 provides this command, the CPU 202 may determine that the power consumption of the client device 200 indicates that at least one component is still active. The CPU 202 may then determine that the overall power consumption of the components differs from an expected power consumption of the one or more components.

Figure 5:
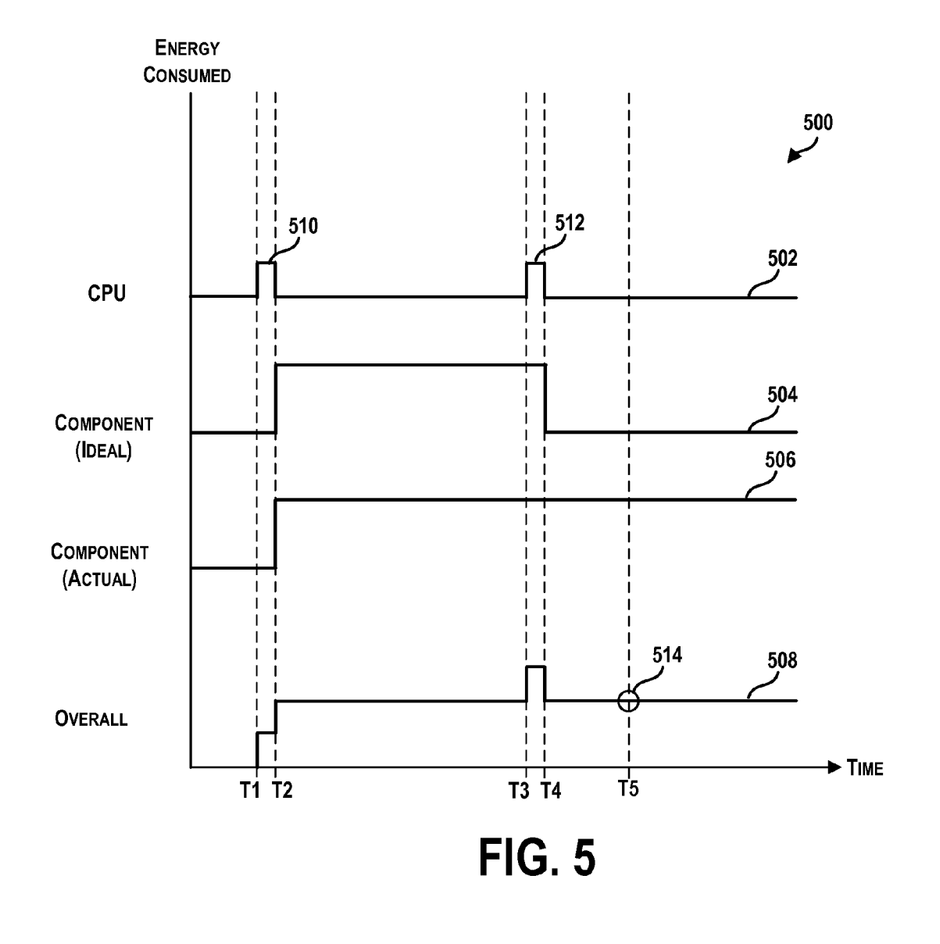
FIG. 5 shows a conceptual diagram illustrating an example of power consumption that differs from an expected power consumption of the one or more components.

To illustrate, FIG. 5 shows a conceptual diagram 500 illustrating an example of power consumption that differs from an expected power consumption of the one or more components. As shown, FIG. 5 shows example representations of energy consumption by the client device 202 and various elements of the client device 202 over time. In particular, diagram 500 includes a CPU usage pattern 502, an ideal component usage pattern 504, an actual component usage pattern 506, and an overall usage pattern 508 indicating the overall energy usage of the client device 200 (here, the summation of the usage patterns 502 and 506).

In this example, at time T1, the CPU transmits to the component a command signal 510 instructing the component to perform an operation (e.g., begin scanning for a GPS signal), as shown in usage patterns 502 and 508. At time T2, the component begins performing the operation, as shown in usage patterns 506 and 508. At time T3, the CPU transmits to the component a command signal 512 instructing the component to stop performing the operation, as shown in usage patterns 502 and 508. At time T4, the component should ideally stop performing the operation, as shown in ideal component usage pattern 504. Instead, in this example, the component continues performing the operation, as shown in usage patterns 506 and 508. Consequently, at time T5, the CPU samples 514 the overall power consumption of the client device 200 and determines that the power consumption is abnormal.

Although the above discussion with reference to FIG. 5 discusses one component, it should be understood that this was for purposes of simplicity and explanation only. In practice, multiple components may be consuming energy at the same time, which would affect the overall usage pattern 508.

In other examples, determining that the overall power consumption of the one or more components differs from an expected power consumption may involve the CPU 202 determining that a total energy-consumption value is above an expected energy-consumption value. In some examples, this operation may be based on the last energy-usage messages that the CPU 202 received from the components and any subsequent commands the CPU 202 provided to the components. For example, the CPU 202 may be able to deduce from the previous operating states of the components and any subsequent commands what operating state each of components should be operating in. From this information, the CPU 202 may determine an expected amount of energy-consumption by the components, which the CPU 202 may compare to the actual amount of energy being consumed by the client device 200 that is attributed to the components.

Returning to FIG. 4, at block 410, the method 400 involves identifying at least one differing component that is causing the overall power consumption to differ from the expected energy-consumption based on the plurality of historical energy-usage patterns and a plurality of new energy-usage messages received after the plurality of energy-usage patterns were determined. In general, this operation may involve the CPU 202 determining the present operating state of each component, identifying energy-usage patterns that correspond to those operating states, and then comparing the present energy usages to the identified energy-usage patterns.

In particular, according to example implementations, the CPU 202 may perform this operation by determining one or more components that are presently consuming energy. Such determination may be based on energy-usage messages received after the CPU 202 has determined the energy-usage patterns. For example, the CPU 202 may consider the last energy-usage messages that it received from the components. From these energy-usage messages, the CPU 202 may then determine which components are consuming power (assuming that the components have not stopped consuming power since transmitting their last energy-usage messages).

For each of the determined components that are presently consuming energy, the CPU 202 may then determine an operating state and an amount of energy consumed (and/or perhaps a rate at which the energy is being consumed) based on energy-usage messages from these components. Then, the CPU 202 may, for each component that is presently consuming energy, identify an energy-usage pattern corresponding to the determined operating state. For example, the CPU 202 may locate these energy-usage patterns in the energy data 218, which may be stored by component and/or organized by operating state.

Thereafter, the CPU 202 may compare the determined amount of energy consumed (and/or the rate at which the energy is being consumed) by each component to the identified energy-usage pattern corresponding to the determined operating state. From this comparison, the CPU 202 may determine that at least one component is causing the overall power consumption to differ from the expected power consumption by determining that the at least one component is presently consuming power abnormally in comparison to its historical power consumption indicated by its energy-usage pattern. In some examples, the CPU 202 may determine that a component is causing the power consumption differential when the comparison results in a difference that exceeds a predetermined differential threshold.

At block 412, the method 400 involves the one or more processors modifying the amount of energy that the at least one differing component is consuming (and/or perhaps the rate at which it is consuming the energy). This operation may involve the CPU 202 transmitting a command to the differing component that instructs the differing component to change its behavior. For example, the CPU 202 may transmit a power-off message to the component instructing the component to power off. In other examples, the CPU 202 may transmit an operation message instructing the component to perform an activity different from the activity that the component is presently performing (e.g., exit sniff mode and instead page scan). In some examples, after the CPU 202 transmits the command to the component causing the power consumption differential, the CPU 202 may again sample the overall power consumption to verify that that component was indeed the cause of the overall power consumption differing from the expected power consumption.

In some implementations, the CPU 202 may transmit a command to the component after the CPU 202 determines that the component has consumed a predetermined threshold amount of energy or that the component has abnormally consumed energy for a threshold amount of time. In some cases, these thresholds may be based on other operations being performed on the client device 200 that require power from the battery 206. For example, despite a component consuming too much energy, the CPU 202 may wait to send a power-off message because the client device 200 may be otherwise inactive (e.g., other components may not be consuming much or any energy). In this way, the CPU 202 may take a corrective action not only based on a single component abnormally consuming power but also on the overall power consuming activities of the client device 200. Accordingly, the examples described herein may help provide system wide feedback to the CPU 202 that allows the CPU 202 to intelligently manage the power consumption of the client device 200.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   periodically receiving, by one or more processors of a computing device from a plurality of components of the computing device, a plurality of energy-usage messages, wherein a given energy-usage message indicates a given operating state of a given component and an amount of energy consumed by the given component while operating in the given operating state;

based on the plurality of energy-usage messages, determining a plurality of historical energy-usage patterns including a given energy-usage pattern that indicates historical energy consumption of the given component while operating in the given operating state;

after determining the plurality of historical energy-usage patterns, receiving a plurality of new energy-usage messages including a new energy-usage message from the given component;

while one or more of the plurality of components are consuming energy, determining that overall power consumption of the one or more components differs from an expected power consumption of the one or more components;

identifying at least one differing component that is causing the overall power consumption to differ from the expected power consumption, wherein the identifying comprises: based on the new energy-usage message indicating that the given component is operating in the given operating state, comparing the historical energy consumption indicated by the given energy-usage pattern to an amount of energy consumption of the given component indicated by the new energy-usage message; and modifying an amount of energy that the at least one differing component is consuming.

2. The method of claim 1, wherein the given operating state comprises one of an idle state corresponding to a first energy consumption level, a miscellaneous state corresponding to a second energy consumption level greater than the first energy consumption level, and a transport state corresponding to a third energy consumption level greater than the second energy consumption level.

3. The method of claim 1, wherein the given energy-usage message comprises (i) an indication of a voltage applied to the given component, (ii) an indication of a current received by the given component, and (iii) a duration of time the current was received by the given component.

4. The method of claim 1, wherein the given energy-usage pattern comprises an energy-consumption range indicating a range of historical energy consumption values corresponding to the given operating state.

5. The method of claim 1, wherein determining that the overall power consumption of the one or more components differs from the expected power consumption of the one or more components comprises determining that a total energy-consumption value is above an expected energy-consumption value.

6. The method of claim 1, wherein identifying the at least one differing component that is causing the overall power consumption to differ from the expected power consumption comprises:

determining the one or more components that are presently consuming energy, wherein the one or more determined components comprise the given component; and for each component of the determined one or more components that are presently consuming energy:

determining an operating state and an amount of energy consumed based on an energy-usage message, in the plurality of new energy-usage messages, received from the component; and identifying an energy-usage pattern corresponding to the determined operating state.

7. The method of claim 6, wherein identifying the at least one differing component that is causing the overall power consumption to differ from the expected power consumption further comprises, for each of the determined one or more components that are presently consuming energy:

comparing the determined amount of energy consumed to the identified energy-usage pattern; and determining that the comparison results in a difference that exceeds a predetermined differential threshold.

8. The method of claim 1, wherein the overall power consumption comprises the total power consumption of the computing device.

9. The method of claim 1, wherein the overall power consumption comprises a combined power consumption of the one or more components consuming energy.

10. A computer-readable medium having stored therein instructions that when executed by a computing device cause the computing device to:

receive, by one or more processors of the computing device from a plurality of components of the computing device, a plurality of energy-usage messages, wherein a given energy-usage message indicates a given operating state of a given component and an amount of energy consumed by the given component while operating in the given operating state;

based on the plurality of energy-usage messages, determine that overall power consumption of one or more components of the plurality of components differs from an expected power consumption of the one or more components;

identify at least one differing component that is causing the overall power consumption to differ from the expected power consumption, wherein the identifying comprises:

retrieving, from data storage, energy data comprising a given energy-usage pattern indicating historical energy consumption of the given component while operating in the given operating state, and comparing the historical energy consumption indicated by the given energy-usage pattern to the amount of energy indicated by the given energy-usage message; and modify an amount of energy that the at least one differing component is consuming.

11. The computer-readable medium of claim 10, wherein determining that the overall power consumption differs from the expected power consumption comprises determining that a total energy-consumption value is above an expected power consumption value.

12. The computer-readable medium of claim 10, wherein identifying the at least one differing component that is causing the overall power consumption to differ from the expected power consumption comprises:

determining the one or more components that are presently consuming energy, wherein the one or more determined components comprise the given component; and for each component of the determined one or more components that are presently consuming energy:

determining an operating state and an amount of energy consumed by the component based on a respective energy-usage message received from the component; and identifying, from the retrieved energy data, an energy-usage pattern corresponding to the determined operating state.

13. The computer-readable medium of claim 12, wherein identifying the at least one differing component that is causing the overall power consumption to differ from the expected power consumption further comprises, for each of the determined one or more components that are consuming energy:
comparing the determined amount of energy consumed to the identified energy-usage pattern; and
determining that the comparison results in a difference that exceeds a predetermined differential threshold.

14. The computer-readable medium of claim 10, wherein modifying the amount of energy that the at least one differing component is consuming comprises:
transmitting a power-off message to the at least one differing component.

15. The computer-readable medium of claim 14, wherein modifying the amount of energy that the at least one differing component is consuming further comprises:
before transmitting the power-off message, determining that the at least one differing component has consumed a predetermined threshold amount of energy.

16. A computing device comprising:
one or more processors;
a plurality of components; and
a computer-readable medium having stored therein executable instructions, that when executed by the one or more processors, cause the computing device to:
periodically receive, by the one or more processors from the plurality of components, a plurality of energy-usage messages, wherein a given energy-usage message indicates a given operating state of a given component and an amount of energy consumed by the given component while operating in the given operating state;
based on the plurality of energy-usage messages, determine a plurality of historical energy-usage patterns including a given energy-usage pattern that indicates historical energy consumption of the given component while operating in the given operating state;
after determining the plurality of historical energy-usage patterns, receive a plurality of new energy-usage messages including a new energy-usage message from the given component;
while one or more of the plurality of components are consuming energy, determine that overall power consumption of the one or more components differs from an expected power consumption of the one or more components;
identify at least one differing component that is causing the overall power consumption to differ from the expected power consumption,
wherein the identifying comprises: based on the new energy-usage message indicating that the given component is operating in the given operating state, comparing the historical energy consumption indicated by the given energy-usage pattern to an amount of energy consumption of the given component indicated by the new energy-usage message; and
modify an amount of energy that the at least one differing component is consuming.

17. The computing device of claim 16, wherein identifying the at least one differing component that is causing the overall power consumption to differ from the expected power consumption comprises:
determining the one or more components that are presently consuming energy, wherein the one or more determined components comprise the given component; and
for each component of the determined one or more components that are presently consuming energy:
determining an operating state and an amount of energy consumed by the component based on an energy-usage message, received from the component, in the plurality of new energy-usage messages; and
identifying an energy-usage pattern corresponding to the determined operating state.

18. The computing device of claim 17, wherein identifying the at least one differing component that is causing the overall power consumption to differ from the expected power consumption further comprises, for each of the determined one or more components that are consuming energy:
comparing the determined amount of energy consumed to the identified energy-usage pattern; and
determining that the comparison results in a difference that exceeds a predetermined differential threshold.

19. The computing device of claim 16, wherein modifying the amount of energy that the at least one differing component is consuming comprises:
transmitting a power-off message to the at least one differing component.

20. The computing device of claim 19, wherein modifying the amount of energy that the at least one differing component is consuming further comprises:
before transmitting the power-off message, determining that the at least one differing component has consumed a predetermined threshold amount of energy.

* * * * *